March 9, 1965 T. F. BEMIS 3,172,480
THREE-POINT OFFSET UNIVERSAL COUPLING SYSTEM
Filed Oct. 19, 1961 6 Sheets-Sheet 1

Thomas F. Bemis
INVENTOR.

March 9, 1965 T. F. BEMIS 3,172,480
THREE-POINT OFFSET UNIVERSAL COUPLING SYSTEM
Filed Oct. 19, 1961 6 Sheets-Sheet 2

Thomas F. Bemis
INVENTOR.

March 9, 1965 T. F. BEMIS 3,172,480
THREE-POINT OFFSET UNIVERSAL COUPLING SYSTEM
Filed Oct. 19, 1961 6 Sheets-Sheet 4

Thomas F. Bemis
INVENTOR.

United States Patent Office

3,172,480
Patented Mar. 9, 1965

3,172,480
THREE-POINT OFFSET UNIVERSAL COUPLING SYSTEM
Thomas F. Bemis, Plainville, Kans.
(3004 Northridge Court, Hays, Kans.)
Filed Oct. 19, 1961, Ser. No. 146,098
3 Claims. (Cl. 172—7)

This invention relates to coupling systems between trailing type implements and towing vehicles. More particularly, the present invention relates to a novel coupling arrangement between different types of earth engaging implement frames and towing tractor vehicles semi-mounting rearwardly thereof, the automatically controlled type of power lift mechanism commonly referred to as a "three-point quadrant hydraulic system."

Implements that are close-mounted to modern type tractor vehicles are commonly controlled in accordance with the soil density of the earth by means of a three link connection to the tractor vehicle, two of the links being power operated by a hydraulic mechanism, the pressure of which is controlled by the variable forces transmitted through the top connecting link or, in some instances tractors having three link arms of which the two lower link arms are power lifted and also concomitantly transmit variable forces to the hydraulic mechanism whereas the top link arm is non-operative as a receptive instrument. Either of these conventional types of receiving quadrant hydraulic systems may be adapted for use in connection with this invention.

The coupling arrangement of the present invention therefore, takes advantage of three-point hitch connection and power lift mechanism referred to, to establish a unique and novel interrelationship between the towing tractor vehicle, the power lift mechanism, a novel three-point offset connecting device or hitch, a coupler device, the implement frame and the earth engaging element mounted thereon as well as with a frame steerage mechanism when used. As a result of the aforementioned relationship to be specifically described hereafter, several significant advantages and benefits are derived one of which is the wide application of the coupling system of the present invention to earth engaging implements of many different types. The novel coupling system is therefore applicable to all types of trailing, earth engaging implements such as graders, land levellers, moldboard plows, one-way disk plows, tandem disk harrows, frame mounted chisels, stubble mulching undercutters, irrigation ditchers, terracers, dirt scrapers, etc.

The coupling system of the present invention is of particular importance in connection with the present-day trend in farm equipment wherein trailing type machines of increasingly larger sizes are common place as well as a corresponding increase in tractor horsepower and size necessary to be propelled thereby. Accordingly, the integration problem involved in coupling the wider and longer framed variety of implements to the towing tractor vehicle have increased in both magnitude and scope. Such problems involve directional steerage of the implement, weight distribution and tool design limitations which problems have become particularly aggravated with the increased size of the implement frame and the greater variation in earth engaging forces and frame displacements that must be coped with.

The aforementioned problems are patricularly dealt with by the coupling system of the present invention by embodying all of the beneficial attributes of close-mounted hitch devices for trailing type implement frames coupled to a three-link power lift mechanism hitch and also avoids the disadvantages of and limitations of such previously used coupling systems. Accordingly, the coupling system of the present invention involves a rigid hitch device connected to the three link members of the tractor vehicle power lift mechanism having an offset pivot connection to a coupler device to which the implement frame is in turn connected for universal movement with respect to the hitch device. The coupler device will however restrict relative movement of the implement frame in a vertical direction with respect to the hitch device so that the implement frame will under certain conditions be displaced in the longitudinal vertical towing plane as an integral part of the aforementioned hitch device in order to permit the power lift mechanism to exercise its draft control influence over the implement frame. However, under other conditions, the forward end of the implement frame is displaced with respect to the hitch device in the vertical plane within a limited amount so as to thereby influence the displacement of the hitch device by the power lift mechanism resulting in corrective displacement by the power lift mechanism in orders to re-establish the draft control relationship. Accordingly, the aforementioned variation in the coupling action will depend upon the vertical displacement imposed both on the towing vehicle and the implement frame. The displacing influence of the earth on the implement frame is further subject to automatic control by the disposition of an effective point of ground contact between the implement frame and the earth. This effective point of ground contact will vary within limits and will constitute a collective point of contact determined by the earth engaging tool mounted on the implement frame and frame supporting dirigible wheels. The dirigible wheels are provided so that the implement frame which is universally movable relative to the hitch device without being under its positioning influence except in the vertical plane, may establish horizontal stability for any given vertical position setting of the earth engaging tool resulting also in the establishment of the effective point of ground contact, between the earth engaging tool and the dirigible wheels. Furthermore, displacement of the implement frame with respect to the coupler device is permitted for automatic steerage purposes so that the implement frame may properly align itself with respect to the towing vehicle when displaced with respect thereto by side draft forces. However, steerage and horizontal stabilizing displacements of the implement frame are isolated by the particular coupler device of the present invention from imposing any positional modifying influence on the draft control influence of the power lift connected hitch device and the corrective displacement influence resulting from limited relative displacement in a vertical plane between the hitch device and the implement frame.

It is therefore an object of this invention to establish a draft line for an earth engaging tool in relation to the propelling tractor. The disposed draft line establishes the working depth of the earth engaging tool and may be established by the hitching device as described from any two predominate ground contact points supporting the implement frame. The predominate ground contact points can be determined either by the earth engaging tool or by the dirigible whels, or a combination thereof. Once the draft line is established the working 3-point quadrant hydraulic system will automatically maintain the extended limit of the draft line to a maximum working depth to the earth engaging tool accordingly as either the tool or as the buoyancy of the dirigible wheel means makes ground contact in loose or hard soils, whichever is predominate.

Another object of this invention is to provide a semi-mounted means for trailing-type implements whereby weight can be transferred between the forward end and the rearward end of the implement frame to enhance soil penetration of the earth engaging tool means without affecting the draft-control attributes of the three-point power lift system utilized in connection with the invention.

A further object of this invention is to provide a simple universal means for connecting a semi-mounted trailing type implement to a propelling tractor having a three-point power lift mechanism whereby additional mechanical refinements and modification of the tractor equipment or special attachments to facilitate the attachment of the implement to the propelling tractor is not needed.

An additional object of this invention is to provide a coupling means for a semi-mounted trailing type implement whereby the implement frame is sufficiently flexible with respect to the hitch means when in a raised transport position thereby eliminating any rigid bridging effect between the propelling tractor and the implement frame.

A further object of this invention is to provide a coupling means for a semi-mounted trailing-type implement whereby the angle of attack of the earth engaging tool may be reset to a given draft line by manually displacing the hitch means relative to the link arms of the power lift mechanism by lengthening or shortening the top link arm thereof; whereby shortening the top link arm causes the lowering of the forward end of the implement frame thereby increasing the angle of attack thereof, and lengthening the top link arm causes the raising of the forward end of the implement frame thereby decreasing the angle of attack thereof.

It will therefore be apparent from the foregoing, that the objects of the present invention relate to the provision of a coupling system between a towing vehicle and trailing type implement frame that automatically adapts itself for use under varying conditions and for earth engaging tools serving different specific purposes. Further, it is an object of the present invention to enable the coupling of earth engaging tool implements to towing vehicles with a wider degree of flexibility, adjustability and capable of easier handling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 9, 22, 23, 24:
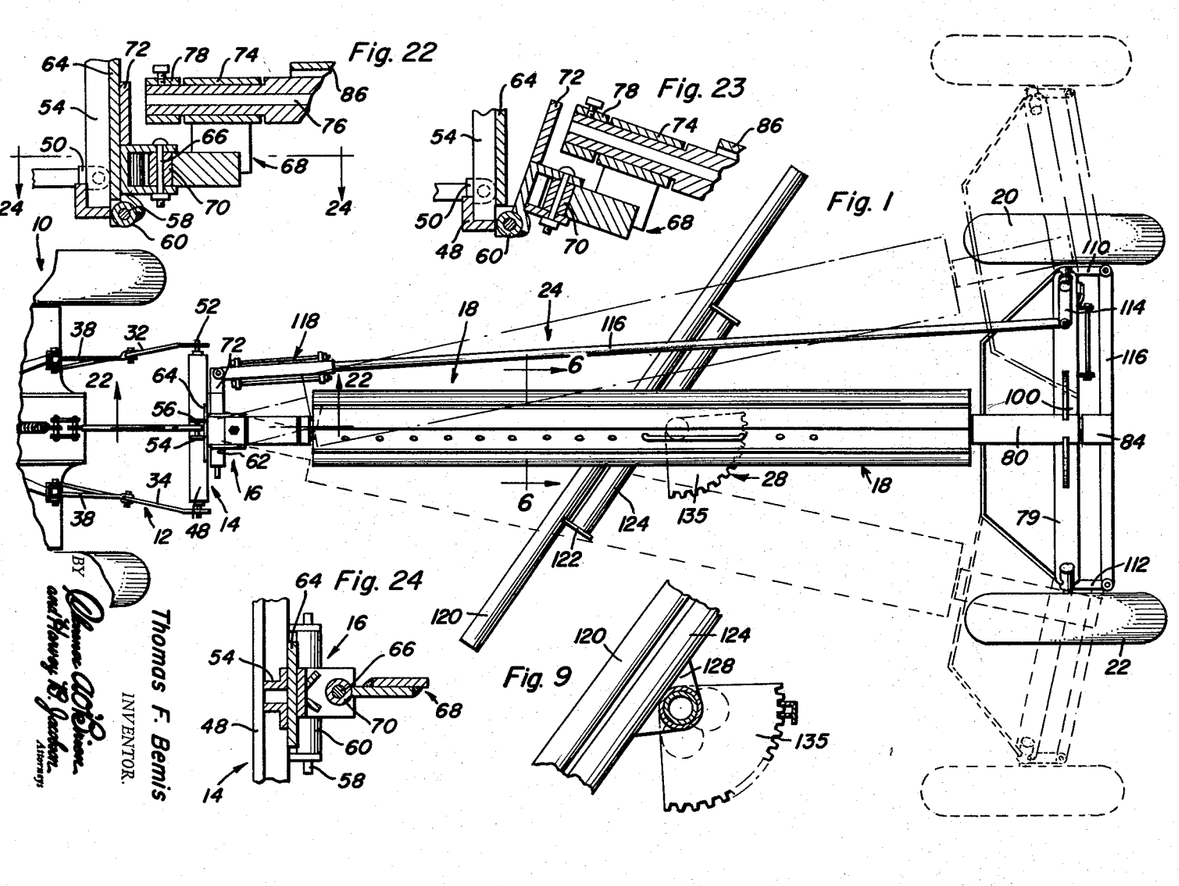
FIGURE 1 is a top plan view of a typical combination of towing vehicle and trailing type implement arrangement in accordance with the principles of the present invention.
FIGURE 9 is a partial sectional view taken through a plane indicated by section line 9—9 of FIGURE 4.
FIGURE 22 is an enlarged partial sectional view taken substantially through a plane indicated by section line 22—22 in FIGURE 1.
FIGURE 23 is a sectional view similar to FIGURE 22 showing the hitch and coupler in a different operative condition.
FIGURE 24 is a partial sectional view taken substantially through a plane indicated by section line 24—24 in FIGURE 22.
Figure 2:
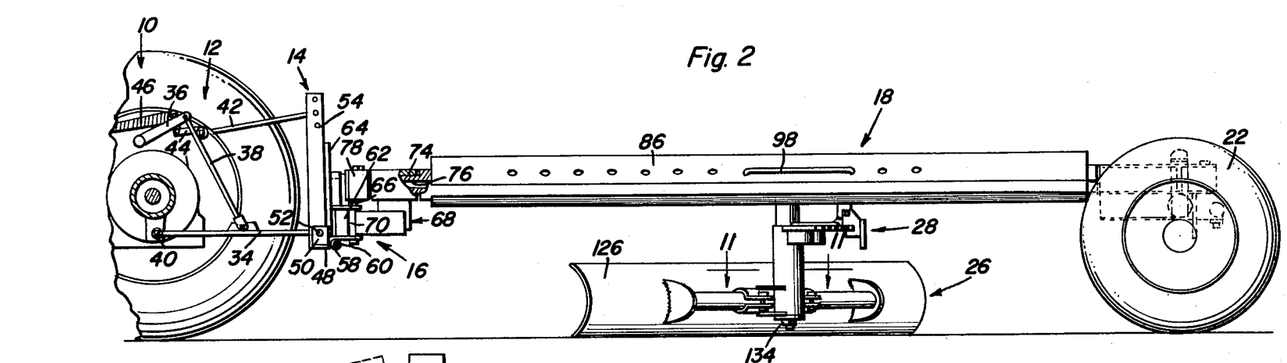
FIGURE 2 is a side elevational view of the arrangement shown in FIGURE 1.
Figure 3:
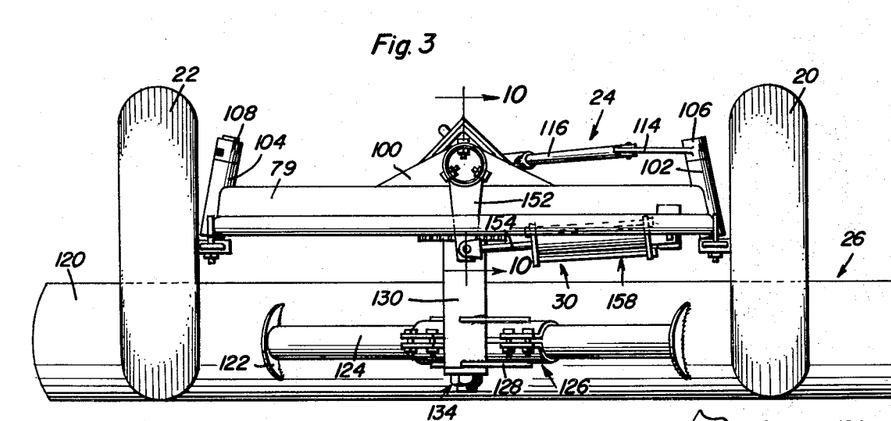
FIGURE 3 is a rear elevational view of the trailing implement shown in FIGURES 1 and 2.

Referring now to the drawings in detail, attention is initially invited toward FIGURES 1, 2 and 3 wherein the components of the coupling system are more completely illustrated. It will therefore be observed, that the tractor type towing vehicle generally referred to by reference numeral 10 has mounted rearwardly thereof a three-point power lift mechanism generally referred to by reference numeral 12 to which a rigid hitch assembly generally referred to by reference numeral 14 is connected. Pivotally coupled about a horizontal axis to the hitch assembly 14, is the universal offset coupling device generally referred to by reference numeral 16 which is mounted on the forward end of the implement frame generally referred to by reference numeral 18. The implement frame rotatably mounts rearwardly thereof, a pair of dirigible support wheels 20 and 22 controlled for steerage purposes by a steerage control mechanism generally referred to by reference numeral 24. An earth engaging tool assembly generally referred to by reference numeral 26 is mounted below the implement frame 18 spaced forwardly of the support wheels for earth engaging purposes at an angle of incident controlled by the position lock mechanism 28 and at a pitch that is controlled by a hydraulic type pitch control mechanism generally referred to by reference numeral 30 as more clearly seen in FIGURE 3. Although the tool assembly 26 is illustrated in the form of a road grader or land leveller in FIGURES 1, 2 and 3, it will be appreciated that many other types of earth engaging tools may be mounted by the implement frame 18 in a fashion peculiar to the particular earth engaging tool as hereinbefore mentioned.

With continued reference to FIGURES 1 and 2, it will be observed that the power lift mechanism and three-point hitch assembly 12 is conventional and includes a pair of rearwardly diverging lower link arms 32 and 34, the positions of which are simultaneously controlled by power operated lever arms 36 connected to the respective lower link arms 32 and 34 by link elements 38 for pivotal movement of the lower link arms about pivot connections 40 disposed adjacent to the tractor vehicle axle. Accordingly, the lower link arms 32 and 34 by being pivotally connected at their rear ends to the rigid hitch assembly 14 are effective to vertically displace the hitch assembly 14 in a vertical plane. Also, connected to the hitch assembly 14, is a top link arm 42 which is mounted on the tractor vehicle by means of a pin connection to a pressure control lever 44 pivotally mounted in fixed relation on the vehicle and spring biased by means of a spring element 46 connected to the pressure control lever 44 at one end and anchored at its other end to the tractor vehicle and being directly connected to an internal hydraulic control valve. Accordingly, pivotal displacement of the hitch assembly 14 and the implement frame 18 coupled thereto because of irregularities of the terrain surface or soil density, will occur with respect to the lower link arms. This displacement of the hitch assembly 14 will be sensed by the pressure control lever 44 through the top link arm 42 in order to variably adjust the position of the lower link arms 32 and 34 by the hydraulic power mechanism in a direction tending to correct the situation by varying the draft line through which the towing vehicle applies force to the effective point of contact between the implement and the ground. As a result thereof, the ground engaging tool has the towing forces applied thereto in a manner responsive to variations in the earth surface and soil density as is well known to those skilled in the art. As will however become hereafter apparent, there are situations under which the draft control influence of the power lift mechanism is advantageously modified through the novel coupling system of the present invention.

The hitch assembly 14 includes a horizontal draft bar 48 to which crank arms 50 are connected in upstanding relation at opposite lateral ends for pivotal connection to the rearward ends of the lower link arms 32 and 34 by link pins 52. Mounted centrally of the horizontal draft bar 48 and projecting upwardly therefrom in perpendicular relation thereto, is a center mast section 54 to which the top link arm 42 is adjustably connected by means of a clevis pin 56. Projecting rearwardly of the link pins 52 and disposed therebelow is a centrally mounted horizontal clevis pin 58 that is connected to the horizontal draft bar 48. The horizontal clevis pin 58 is received within a bearing sleeve 60 that is connected to the coupler 16. The horizontal pivot connection formed by the pin 58 and sleeve 60 between the hitch assembly 14 and coupler 16, is of utmost significance as to its disposition rearwardly of and below the link pins 52 at which point the lower link arms 32 and 34 are pivotally connected to the rigid hitch assembly 14. This offset relationship between the pivotal connections between the lower link arms and hitch assembly and coupler respectively, together with the horizontal position of the pivotal connection established by the pin 58 and sleeve 60 results in the change in influence of the power lift link arms over the implement frame and earth engaging tool mounted thereon as will be further explained hereafter.

The coupler 16 mounts the bearing sleeve by means of which the coupler is pivotally connected to the hitch assembly 14 at the lower forward end of a coupler bracket 62. The bracket 62 as illustrated in FIGURES 1 and 2, abuts against a bracing stop face on plate 64 fixed to the rigid hitch assembly 14 limiting pivotal displacement in a vertical plane of the coupler 16 in a counterclockwise direction with respect to the hitch assembly 14.

Figure 4:
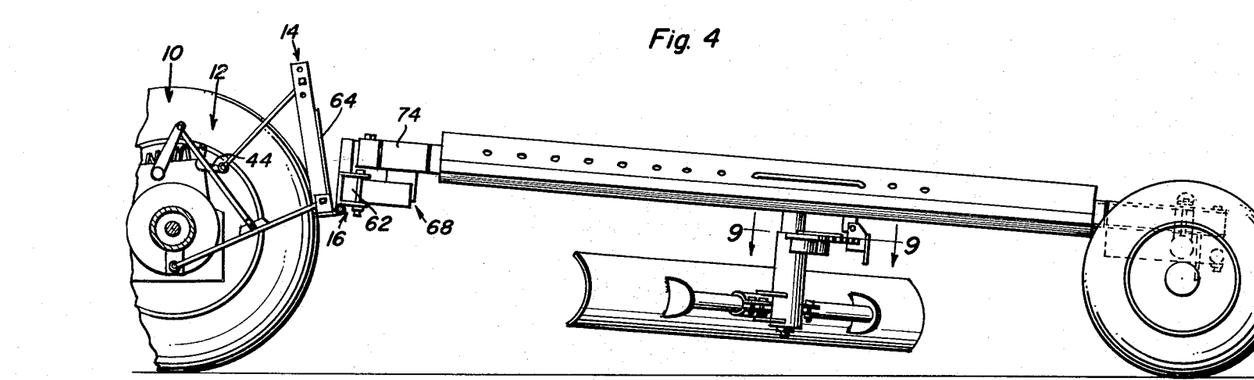
FIGURE 4 is a side elevational view similar to that of FIGURE 2 showing the implement frame in raised position.
Figure 16:
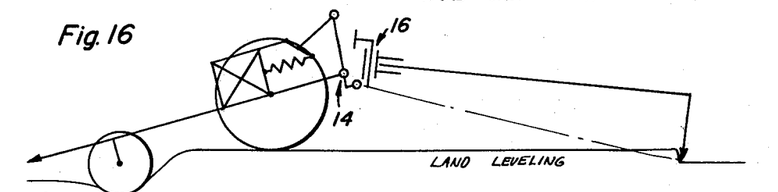

It will be apparent however, that clockwise pivotal movement of the coupler 16 with respect to the hitch assembly 14 is possible in a vertical plane which would occur in response to certain situations in order to bring the pivot point established by the horizontal pin 58 into a draft line which otherwise extends between the pivot point established by the link pins 52 and the effective point of ground contact. As illustrated in FIGURES 4 and 16, such displacement between the coupler 16 and the hitch assembly 14 interrupts the otherwise rigid connection between the hitch assembly and the implement frame 18 under which rigid conditions the power lift hitch mechanism 12 may exercise its draft control and vertical displacement influence over the implement. Although the coupler 16 is movable with the implement frame 18 at its forward end, in a vertical plane, at all times, the implement frame may be displaced relative to the coupler 16 in both a horizontal plane for steerage control purposes, about a vertical axis established by a clevised vertical connecting pin 66 which is connected to a tongue assembly 68, said pin being received within a vertical sleeve 70 fixed to the forward end of the tongue assembly 68. The vertical connecting pin 66 is disposed below the forward end of the implement frame. Also extending laterally from one side of the coupler bracket, is a crank arm portion 72 to which the steerage control mechanism 24 is connected for automatic steerage control as will be hereafter explained.

The tongue assembly 68 it will be apparent, not only enables the implement frame 18 to be displaced in a horizontal directional steerage plane with respect to the coupler 16 but also establishes one end of a longitudinal frame axis about which the implement frame 18 may be displaced for horizontal stabilizing purposes. The tongue assembly 68 therefore fixedly mounts in perpendicular intersecting relation to the vertical connecting pin 66, a longitudinal draft sleeve 74 through which a tubular draft shaft section 76 extends in rotational relation thereto. A draft shaft collar 78 is therefore fixedly mounted at the end of the tubular shaft section 76 in order to hold the draft sleeve 74 in assembled relation on the shaft section 76.

Figures 5, 6, 7, 8:
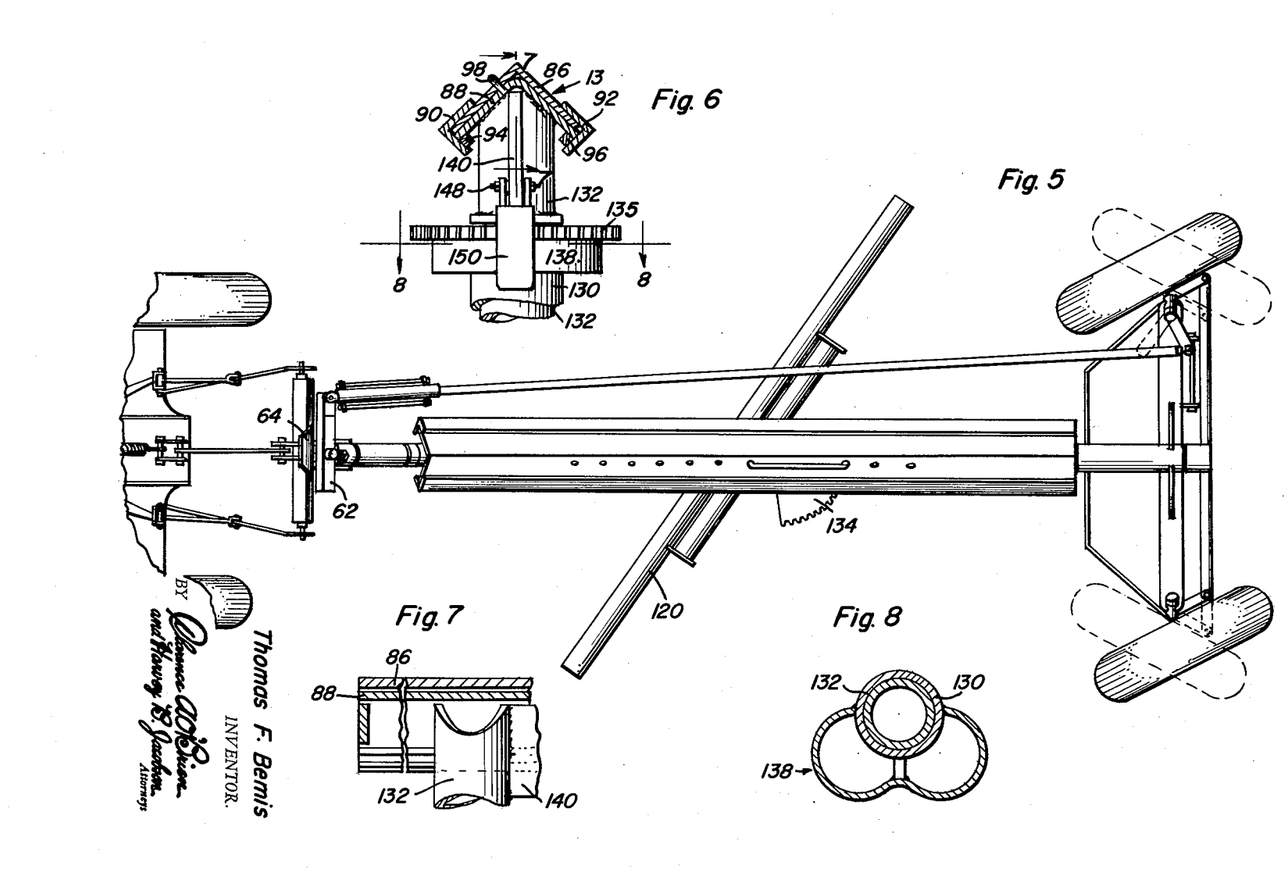
FIGURE 5 is a top plan view of the combination positioned as shown in FIGURE 4.
FIGURE 6 is a partial sectional view taken through a plane indicated by section line 6—6 of FIGURE 1.
FIGURE 7 is a partial sectional view taken through a plane indicated by section line 7—7 in FIGURE 6.
FIGURE 8 is a partial sectional view taken through a plane indicated by section line 8—8 in FIGURE 6.
Figure 10:
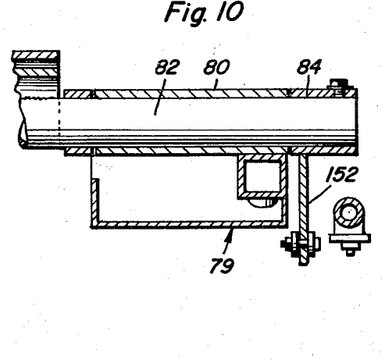
FIGURE 10 is a partial sectional view taken through a plane indicated by section line 10—10 of FIGURE 3.
Figure 11:
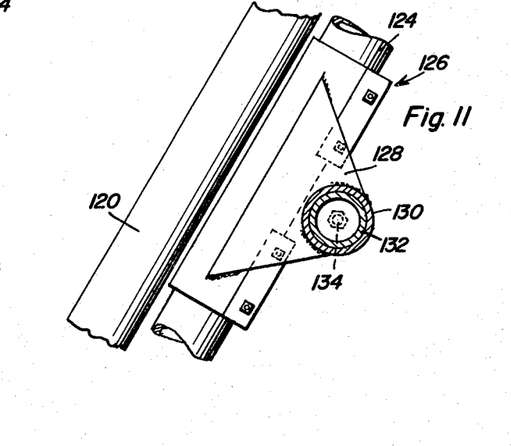
FIGURE 11 is a partial sectional view taken through a plane indicated by section line 11—11 in FIGURE 2.

The shaft section 76 is therefore a part of the implement frame 18 through which the longitudinal axis extends terminating at the forward end through the sleeve 74 and at the rear end in spaced relation above the ground supported by the support wheels 20 and 22 by means of a transverse frame assembly 79 as more clearly seen in FIGURES 3 and 10. The weighted support wheel frame assembly 79 therefore mounts thereabove a rear longitudinal draft sleeve 80 which rotatably receives a rear draft shaft section 82 held in axially assembled relation by means of a second draft shaft collar 84 that is fixed to the end of the draft shaft section 82 projecting beyond the sleeve 80. In order to form the rigid frame assembly 18, the draft shaft sections 76 and 82 are respectively welded to a main frame member 86. Frame slide member 88 is adjustably positioned with respect to rigid frame assembly 86 positioning the implement tool the length of the implement frame and thereby varying the effective point of ground contact. The frame members 86 and 88 are made of angle iron with the main frame member 86 having welded thereto on opposite longitudinal sides angle iron lip members 90 and 92 as more clearly seen in FIGURE 6. The lip members 90 and 92 also have fixed thereto as by welding elongated strips 94 and 96 forming a slide track with the lip members 90 and 92 for slidably receiving the inner supporting slide member 88. The frame members 86 and 88 are locked for an adjusted positional placement of slide member thereto by a locking arm 98 which extends through apertures provided in the frame member 86 for such purpose of holding slide member 88 in a selected position.

Adjusting the longitudinal positional placement of the grading blade 120 along the length of the rigid implement frame assembly 86 is made available to meet certain earth engaging circumstances. Positioning the grading blade, and having attached end wings thereon disposed perpendicular and at the rearward end of the implement frame it is best adapted for using the implement as a dirt scraper; by placing the blade to the forward end it is best for land smoothing. It will therefore be appreciated that by positional placement of the grading blade along the length of the implement, to achieve the various controlled conditions, a single unit may become a multi-purpose tool.

Referring now to FIGURES 1 and 3, it will be observed that the rear support frame assembly 79 extends laterally on both sides of the frame assembly 18 being connected to the sleeve 80 for support thereof by means of the welded plates 100. Connected to the supporting frame assembly 79 at its laterally outer ends, are vertically inclined axle sleeves 102 and 104 through which steering shafts extend for connection to axle shafts projecting inwardly from the support wheels 20 and 22. Fixed to the upper end of the steering shafts are collars 106 and 108 for maintaining the steering shaft in assembled relation within the sleeves 102 and 104. Connected to the lower ends of the steering shafts and projecting rearwardly therefrom, are crank arms 110 and 112 as more clearly seen in FIGURE 1, said crank arms being interconnected by a tie rod 114. Accordingly, pivotal displacement of the steering shaft associated with the support wheel 20 is transmitted by an equal amount in the same direction to the other steering shaft for simultaneous displacement of both support wheels for steering purposes. A second steering crank arm 114 is therefore connected to the upper end of the steering shaft associated with the support wheel 20 by means of the collar 106 constituting part of the steerage control mechanism.

Figure 20:
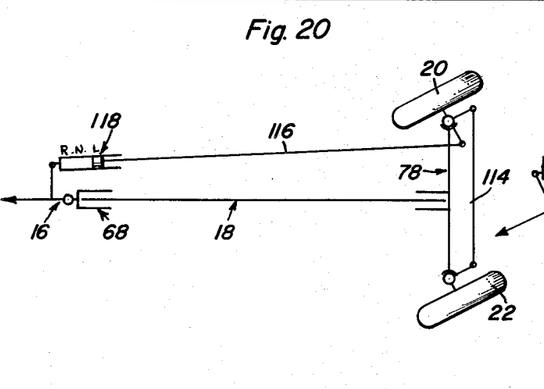
FIGURES 20 and 21 are horizontal plan diagrammatic of other interrelationships involved in the combination of components of the coupling system.
Figure 21:
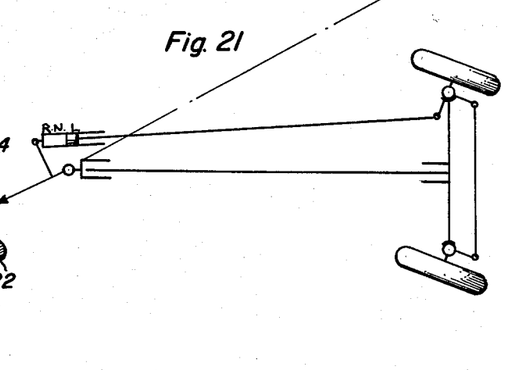

The steerage control mechanism 24 therefore includes a control rod 116 that is pivotally connected to the steering crank arm 114 and is slidably received at its forward end with a hydraulic cylinder device 118 that is pivotally connected to the steering crank extension 72 on the coupler 16. It will therefore be apparent from the dotted positions illustrated in FIGURE 1, that any pivotal displacement of the implement frame 18 about the vertical axis defined by the vertical connecting pin 66, will automatically cause turning of the support wheels in such a direction as to restore alignment between the coupler device 16 and the frame 18 when towed by the tractor vehicle. Attention is therefore invited toward the diagrammatic showing in FIGURE 20 wherein the aforementioned steering action is more simply illustrated. Furthermore, as indicated diagrammatically in FIGURE 20, the effective length of the control rod 116 may be varied through the hydraulic cylinder device 118 which may be under selective control of the vehicle operator through hydraulic conduit connected to the device 118 (not shown). Shortening or lengthening of the effective length of the control rod 116 will therefore be effective to pivotally displace the steering crank arm 114 and therethrough both of the support wheels 20 and 22 in order to effect turning of the implement frame as desired.

The implement tool assembly 26 mounted on the implement frame 18 as one example of the application of the present invention, is in the form of a road grader blade 120 disposed at an angle of incidence with respect to the longitudinal axis of the implement frame 18. The blade 120 therefore has mounted rearwardly thereof a pair of ears 122 as more clearly seen in FIGURE 3 to which a tubular frame member 124 is connected in rearwardly spaced relation to the blade 120. A clamping sleeve assembly 126 adjustably mounts the blade 120 by embracing the tubular frame member 124, said clamping assembly 126 being connected as by welding plates 128 to a vertical tubular mounting shaft 130 adjacent the lower end thereof. As more clearly seen in FIGURES 6, 7 and 8, an inner shaft 132 extends through the mounting shaft 130 supporting the mounting shaft 130 by a holding bolt assembly 134 (FIGURE 3). The inner shaft 132 is fixed as by welding to the slide supporting member 88 of the implement frame 18 and is slidable therewith when positioning the slide supporting member 88 the length of the implement frame. The upper end of the mounting shaft 130 has a sector toothed gear 135 welded thereto and supported therebelow by a brace assembly 138 as more clearly seen in FIGURE 8. The inner shaft 132 on the other hand which is fixedly connected to the frame 18, has welded thereto and projecting rearwardly therefrom below the slide member 88, a plate member 140 on which there is pivotally mounted by pivot 148 a lock lever 150. Accordingly, the shaft 130 carrying the implement blade 120 therebelow, may be locked in angularly adjusted position with respect to the inner shaft 132 by engagement of the lock lever 150 with the notch of the sector gear 135 as shown in FIGURE 9. The lock lever 150 may be manually released from the sector gear 134 in order to angularly reorientate the implement tool 26 with respect to the implement frame 18.

The inclination of the implement tool 26 in a transverse vertical plane as well as the horizontal stability of the implement frame, may be controlled by means of the hydraulic control mechanism 30 which is more clearly illustrated in FIGURE 3. This inclination when considered in connection with the grader blade 120, will determine the rate of displacement of earth at a given speed of the implement frame. The inclination will therefore be varied in accordance with the earth moving operation being performed and the type of implement tool associated therewith. Referring therefore to both FIGURES 3 and 10, it will be observed that the implement frame 18 may be pivoted with respect to its longitudinal axis by a lever arm 152 fixed as by welding below the rear draft collar 84 and pivotally connected to a piston rod 154 which in turn is connected to a piston received in the power cylinder device 158 pivotally mounted on the support frame assembly 79. Accordingly, hydraulic fluid supplied to the cylinder device 158 through hydraulic conduit (not shown) and controlled from the vehicle, may adjustably position the implement frame 18 by pivotal displacement thereof about its longitudinal axis through the arm 152. The angle at which the implement tool or blade 120 engages the earth may thereby be varied and or the horizontal stability of the frame controlled in order to obtain earth engagement with the implement tool establishing an effective point of ground contact in accordance with the requirement of the particular ground engaging tools being mounted by the implement frame, and purpose for which it is designed. It will be appreciated of course that the location of the effective point of ground contact will effect the operation of the coupling system by changing the draft line angle. The effective point of ground contact as is well known to those familiar with mechanics, is that single point on the ground at which all of the weight supported at a plurality of spaced contact points may be concentrated to form a kinematically equivalent arrangement. Thus, the effective point of ground contact will depend upon the relative location of the support wheels 20 and 22 and the earth moving tool or grader blade, the inclination and depth of penetration of the grader blade and the distribution of the frame weight between the aforementioned ground contacting components.

Figure 14:
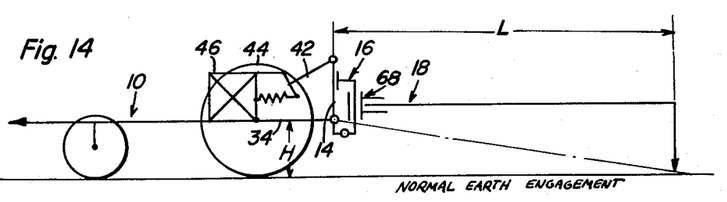
FIGURES 14 through 19 are vertical plan diagrammatic views illustrating the interrelated action of the various components of the coupling system of the present invention under different circumstances.

Referring now to FIGURES 14 through 19, some of the actions involved with the coupling system of the present invention will be diagrammatically illustrated. FIGURE 14 therefore kinematically indicates the coupling system operating under normal draft control conditions or under forwardly moving conditions for which the apparatus is adjusted to perform some given earth moving operation whereby the towing force is transmitted from the hitch assembly 14 to the effective point of ground contact through a draft line axis terminating at a point on the horizontal axis through pin 52 on the hitch assembly 14 since the hitch 14 and coupler 16 act as a rigid assembly to which the lower link arms 32 and 34 are connected and by which forces are transmitted to maintain a predetermined normal draft relationship between the towing vehicle and the implement frame or with respect to the vertical axis through pin 66 on the coupler 16, the horizontal axis through the pin 58 on the hitch 14 and the longitudinal axis through the shafts sections 78 and 82 of the implement frame 18.

Figure 15:
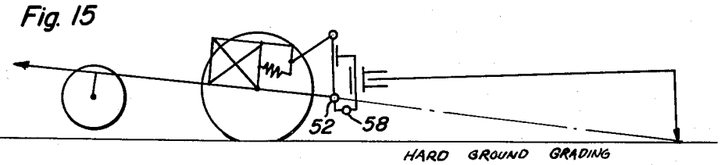

When the implement engages soil exceeding a predetermined density value for which it is adjusted for the given earth moving operation, displacement of the towing vehicle would occur as indicated in FIGURE 15 so as to displace the implement frame through the hitch assembly downwardly in relation to the tractor at the forward end thereof to disturb the aforementioned predetermined normal draft relationship by pivoting the hitch assembly with respect to the lower link arms, about pivot 52 resulting in the pivotal movement of the hitch assembly, counter-clockwise as viewed in FIGURE 15, and movement of the pressure control arm 42 against the spring bias to actuate the power lift mechanism for correctively raising the lower link arms, tending to reestablish the aforementioned predetermined draft relationship between the vertical axes of the towing vehicle and the implement frame. It is to be noted that the resulting action involved is a tendency of the draft line to straighten out along a single line of force. Furthermore, it should also be appreciated that inasmuch as all modern tractors have rubber mounted wheels, any draft pull-down or flattening of the traction tires causes the coupling system to perform as described so that the weight of the forward portion of the implement will always be directly transferred to the rearward end of the propelling tractor by a shifting point on the axis through pin 58 for added traction. Accordingly, due to the mechanical arrangement of this invention weight transfer is one of several results achieved. Likewise, the angle of attack or the angle at which the earth moving blade engages the soil in the forward direction of movement, preset for the earth engaging tool to perform a given earth moving operation, is maintained or in some cases even lightened, and the working depth of the earth engaging tool maintained above a certain confined level within limits by producing changes in the ground contact of the supporting wheels in order to preserve the effective point of ground contact associated with the aforementioned normal draft relationship.

Figure 18:
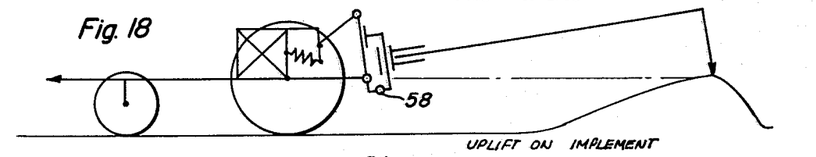

A similar situation to FIGURE 15 arises when the implement frame itself is displaced rather than the towing vehicle by some upwardly lifting force thereon or from ground surface irregularity as to simulate moments of force about the horizontal pivot pin 58, as illustrated in FIGURE 18, whereupon corrective upward movement of the lower link arms occurs in order to re-establish the horizontal positioning of the implement frame, as well as the draft line axis. However, in some instances on certain other machines or implements the support wheels may be adjusted vertically in relationship to the implement frame and thereby re-establish the relative ground depth or height level of the earth engaging tool on differential horizontal levels.

When the implement tool is being utilized for land levelling purposes, the supporting resistance of the earth on the implement frame through the effective point of ground contact for this given earth moving operation, when below predetermined magnitudes, will cause clockwise displacement of the coupler 16 with respect to the hitch assembly 14 as viewed in FIGURE 16 to thereby disturb the aforementioned draft control influence of the power lift of the three-point hitch device 14 on the implement frame to establish the normal draft relationship, whereupon the implement frame is effective through the coupler device 16 to cause pivotal displacement of the hitch assembly with respect to the lower link arms in such a counter-clockwise direction as to cause the pressure control arm to relax allowing the power lift mechanism to lower the lower link arms in order to re-establish the interacting influence between the coupler device 16 and hitch assembly 14, whereby the draft control influence of the hitch 14 is reestablished to correctively displace the implement frame for land levelling purposes.

Figure 17:
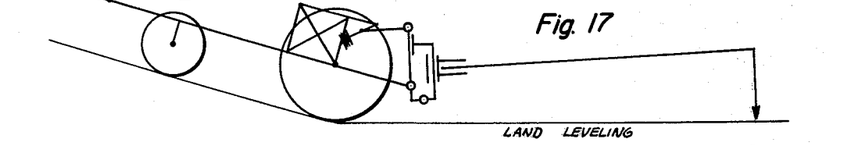

When the towing vehicle is displaced in an upward direction by an upgrade, as shown in FIGURE 17, land levelling conditions are re-established by proper displacement of the lower link arms as indicated. Furthermore, a similar condition between the hitch and coupler exists when bridging the towing vehicle and implement frame upon crossing a ditch or wide depression so that the large stresses otherwise developed in connection with rigidly connected hitches and couplers, is eliminated.

Figure 19:
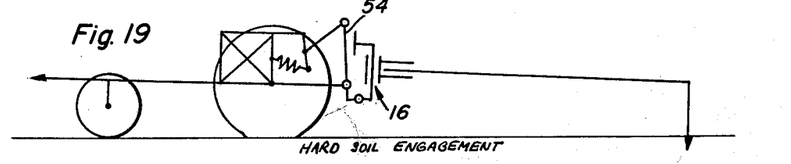

FIGURE 19 illustrates the situation that occurs when the implement suddenly engages hard ground causing pivotal separation of the coupler and the hitch assembly so as to remove the displacing influence of the coupler 16 on the hitch asembly 14, in order to alleviate the situation when no further vertical displacement of the horizontal axis through pin 58 occurs, temporary leverage action occurring through the mast 54 about the link pins 52 as a fulcrum point, to actuate the pressure control arm (the top link arm) resulting in upward displacement of the lower link arms in order to restore the normal draft relationship.

Figure 12:
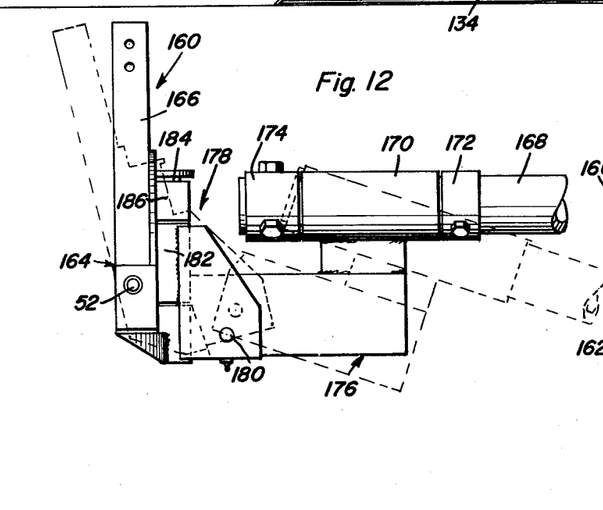
FIGURE 12 is a side elevational view of a modified form of hitch and coupler device.
Figure 13:
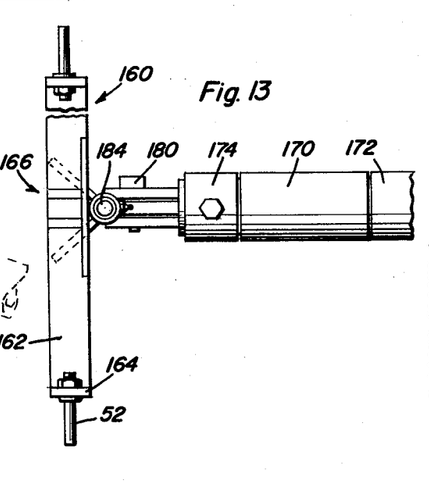
FIGURE 13 is a top plan view of the device illustrated in FIGURE 12.

Referring now to FIGURES 12 and 13, a modified form of hitch assembly and coupler device is illustrated. It will be observed therefore, that the hitch assembly 160 similarly includes a horizontal draft bar 162 with upstanding crank projections 164 at its laterally outer ends to which the link pins 52 are connected and also include a center mast section 166. The implement frame is similarly connected by means of the collars 172 and 174. The sleeve is connected to a rigid tongue assembly 176 which is pivotally connected about the horizontal axis to the coupler device 178 by means of horizontal pin 180. The horizontal pin 180 is therefore spaced rearwardly and below the link pins 52 as in the case of the previously described arrangement. However, inasmuch as no steerage control is provided for the implement frame with which the modified coupling assembly is to be associated, the coupling device 178 is pivotally connected to the hitch assembly about a vertical axis by being connected to a sleeve 182 receiving the vertical connecting pin 184 received within hinge sleeve 186 fixed to the hitch assembly 160. Accordingly, the vertical axis with respect to which the implement frame may be laterally displaced may conveniently be carried by the hitch assembly 160, as distinguished from the previously described arrangement wherein the implement frame was laterally displaced with respect to a vetrical axis carried by the coupler 16 in order to effect thereby the automatic steerage control. Elimination of the steerage control enables the modified coupling arrangement of FIGURES 12 and 13 to provide better support for the vertical axis on the hitch assembly, as the case may be for the heavier type implements. Also, in the modified form of the coupling device, limited pivotal displacement in a vertical plane between the forward end of the implement frame and the hitch assembly does not involve displacement of the universal offset coupler itself with respect to the hitch assembly in the vertical plane through which the large draft forces are transmitted. However, the vertical displacing characteristics as described with respect to the first form of the invention between the hitch assembly and the implement frame are maintained in this second form of the invention to otherwise achieve the same purposes as heretofore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a towing vehicle having power operated mechanism, an implement frame, ground engaging tool means mounted on the frame, a rigid hitch member adapted to couple the frame to the power operated mechanism, said power operated mechanism having control means for sensing variations in the loading of the hitch member to vertically displace the hitch member and the frame coupled thereto, means mounted on the hitch member for establishing two pivotal axes rendered effective to transmit towing force to the implement frame, one of said axes being located adjacent a stop face on the hitch member, a coupling member pivotally connected to the hitch member about said one axis for limited displacement relative thereto between positions directly abutting said stop face of the hitch member and spaced therefrom depending upon the location of an effective point of ground contact established by the tool means and the implement frame, universal means pivotally connecting the implement frame to the coupling member and responsive to variations in ground engagement for establishing said effective point of ground contact from which the implement frame and the coupling means are loaded, and means mounted on said coupling member for directly transferring the load on the implement frame to the hitch member only when the coupling member is in the position abutting the hitch member, the hitch member being indirectly loaded by the frame through the coupling member when in the position spaced therefrom whereby the power operated mechanism is rendered operative to vertically displace the hitch member to a position relative to the coupling member tending to restore the influence exerted thereby over the implement frame when the coupling member is in one of said positions.

2. In combination with a towing vehicle mounting a power lift mechanism having draft sensing means and towing link means vertically displaceable in response to variable pressure exerted on the draft sensing means; a rigid hitch assembly pivotally connected to the towing link means rearwardly of the towing vehicle about a first axis and to the draft sensing means for exerting pressure thereon when loaded, said hitch assembly having a stop face, a coupling device pivotally connected to the hitch assembly about a second axis parallel to said first axis and closely spaced from the stop face, journal means pivotally connected to the coupling device about a steering axis perpendicular to said first and second axes, dirigible wheel supporting means, an implement frame rotatably mounted by said journal means and the wheel supporting means about a longitudinal axis extending rearwardly from the journal means, earth engaging tool means mounted on the implement frame establishing an effective point of ground contact from which the frame is loaded, steering means operatively connecting the coupling device to the wheel supporting means for controlling lateral displacement of the implement frame about said steering axis and the location of the effective point of ground contact, and stop means mounted on the coupling device for limiting displacement of the coupling device about said second axis into abutting relation with the stop face of the hitch assembly for directly transferring the loading on the implement frame to the hitch assembly.

3. In combination with a towing vehicle having a power operated mechanism, an implement frame, ground engaging tool means mounted on the frame, a rigid hitch member having a stop face, said power operated mechanism having control means for sensing variations in the loading of the hitch member by the implement frame to correctively displace the hitch member and the implement frame coupled thereto, means mounted on the rigid hitch member for establishing two closely spaced pivotal axes through which towing force is transmitted from the towing vehicle to the implement frame, one of said axes being located in close rearwardly spaced relation to said stop face on the rigid hitch member, the hitch member being pivotally connected to the power operated mechanism about the other of the two axes, a coupling member pivotally connected to the hitch member about said one of the axes for limited displacement between a position directly abutting the stop face of the hitch member and positions spaced therefrom, means operatively connecting the coupling member to the implement frame for loading thereof from an effective point of ground contact locationally varied by ground engagement with the ground engaging tool means, and means mounted on said coupling member for directly transferring the load on the implement frame to the hitch member only when the coupling member is in said position directly abutting the stop face, the hitch member being indirectly loaded by the implement frame through the coupling member when in said other positions spaced from the stop face.

References Cited in the file of this patent

UNITED STATES PATENTS

| | | |
|---|---|---|
| 1,536,217 | Higinbotham | May 5, 1925 |
| 1,999,748 | Baratelli | Apr. 30, 1935 |
| 2,247,534 | Schlegell | July 1, 1941 |
| 2,320,141 | Kott | May 25, 1943 |
| 2,551,870 | Bridger | May 8, 1951 |
| 2,665,622 | Bunting | Jan. 12, 1954 |
| 2,704,018 | Oehler et al. | Mar. 15, 1955 |
| 2,745,328 | Brimhall | May 15, 1956 |
| 2,907,394 | Cook | Oct. 6, 1959 |

FOREIGN PATENTS

| | | |
|---|---|---|
| 72,889 | France | Dec. 7, 1959 |